July 24, 1962 L. S. HAMER 3,046,058
GYROSTATIC WHEEL STABILIZING APPARATUS
Filed June 13, 1960 2 Sheets-Sheet 1
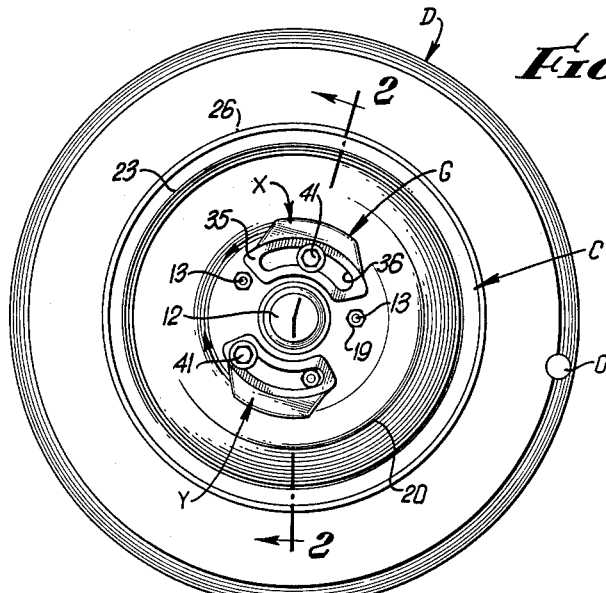
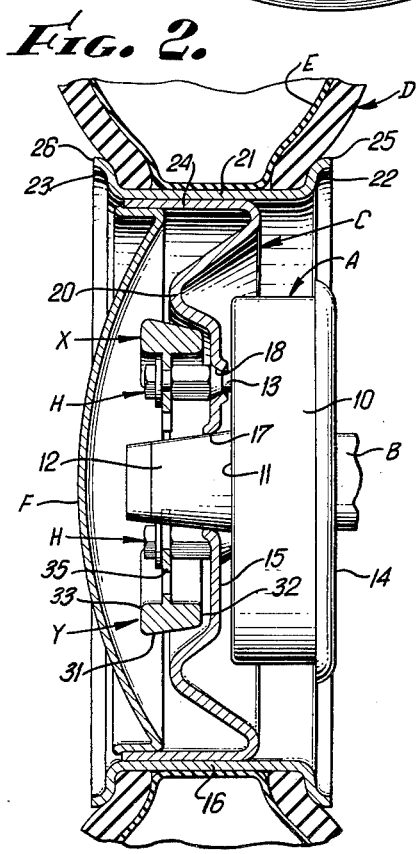
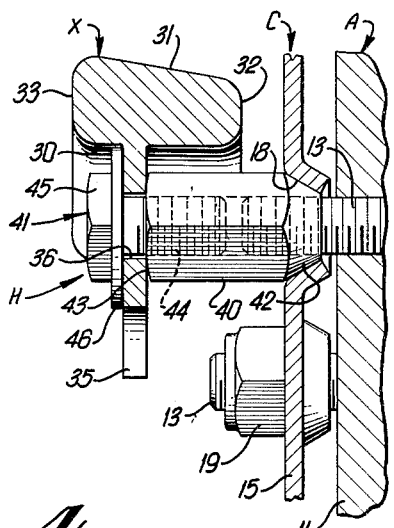
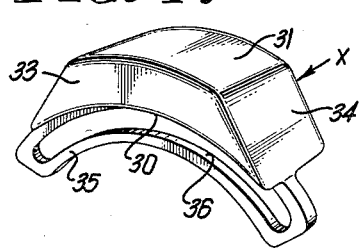
INVENTOR.
LELAND S. HAMER
BY
AGENT.

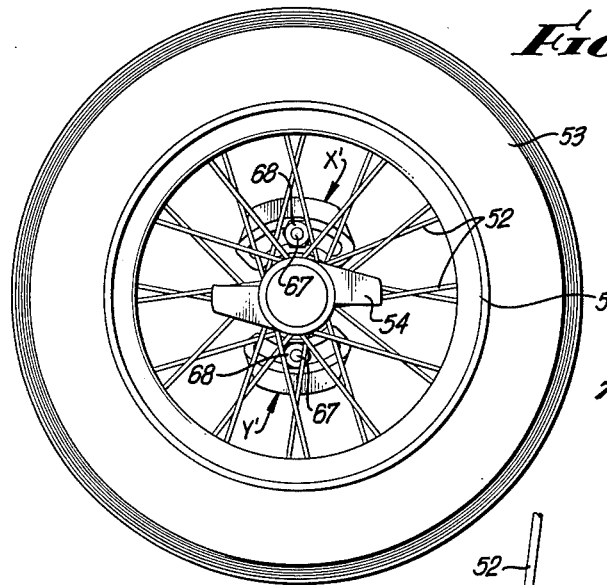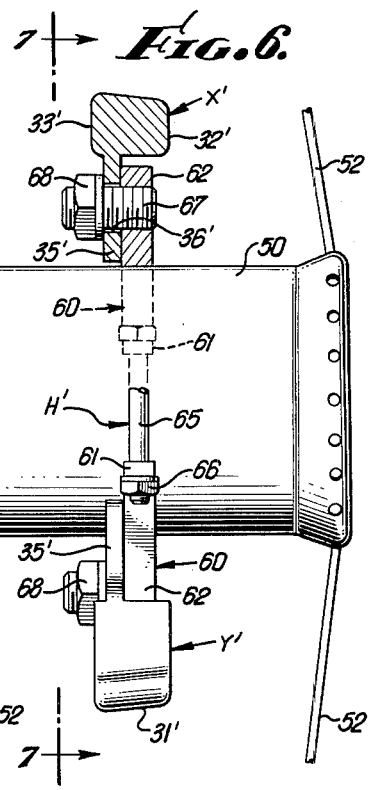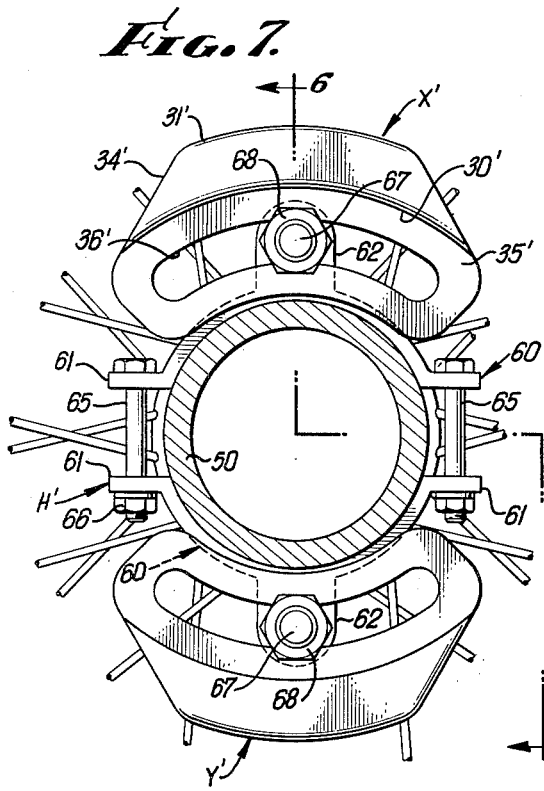

United States Patent Office 3,046,058
Patented July 24, 1962

3,046,058
GYROSTATIC WHEEL STABILIZING
APPARATUS
Leland S. Hamer, 4170 Lakewood Drive,
Lakewood, Calif.
Filed June 13, 1960, Ser. No. 35,658
13 Claims. (Cl. 301—5)

This invention has to do with an apparatus applicable to an automobile wheel assembly and is more particularly concerned with an apparatus adapted to stabilize and assume smooth even rotation of the wheel about its rotative axis.

The ordinary automobile wheel assembly includes, generally, a wheel having a central disc portion with a central mounting means and an outer tire engaging means and an outer tire engaging rim portion, a brake drum fixed to and carried by the disc portion, a pneumatic tire carried by the rim portion and, generally, a pneumatic inner tube within the tire.

It is well known that the ordinary wheel assembly of the general character referred to is seldom dynamically and/or statically balanced. The out of balanced condition of the ordinary wheel assembly is attributable to out of roundness of one or more of the several components going to make it up and/or uneven distribution of mass, that is, displaced material, both circumferentially and/or axially, in one or more of the said components.

Attempts have been made in the past, to balance the ordinary wheel assembly by turning and/or grinding the components to round, and by locating the radial lines or planes through the assembly wherein excessive masses of material occur and attempting to compensate and balance off such masses by the application of balance weights at diametrically opposite sides of the wheel assembly; ordinarily by application of such weights on the rim flanges of the wheel.

The difficulty with such efforts to balance a wheel dynamically, that is, radially, resides in the fact that it is seldom if ever possible to determine the exact radial and axial placement of the unbalancing mass, or the area over which it is distributed. Further, should the above be determinable, the accurate balancing of the wheel would still in most cases, be impossible, due to the inability to properly and accurately orient a counter balance weight, since such weights must ordinarily be engaged on the inner or outer rim flange of the wheel.

While a wheel assembly can be balanced by the application of weights to the rim flanges so that it will appear to be in balance dynamically when turning freely about its axis at extremely low speed, when effective centrifugal forces are not encountered, the same wheel becomes out of balance, dynamically, when its rate of rotation is increased to a point where centrifugal forces come into play. As rate of rotation is increased, the unbalanced condition becomes more critical. This is all due to the relative radial displacement of the unbalancing masses and the counter balance weights.

So far as static balance is concerned, the ordinary method of balancing by application of weights to the rim flanges, is practically ineffective, and can only be guessed at and attempted to be rectified by placing appropriate weight to both the inner and outer rim flanges.

From a practical standpoint, persons presently engaged in balancing wheels recognize that dynamic balancing of a wheel is not true or accurate, but is only intended to reduce, by degree, an undesirable condition, within a rather limited range. So far as static balance is concerned, such persons generally recognize that nothing practical can be done and accept the condition as normal.

The primary object or purpose for having balanced wheels on an automobile is to provide a smoother more comfortable ride and also to provide driving and running conditions which are less fatiguing to the driver and to the automobile as a whole. A further purpose is to improve stability of the automobile on the road and to assure maximum possible control of the vehicle by the driver.

An object of the present invention is to stabilize the wheel assemblies of an automobile so that the wheels turn smooth and uniformly about their relative axes and do not transmit pulsations and vibrations as a result of unbalance conditions existing in the wheel assemblies, into or through the automobile and which cause the wheels to roll uniformly over the road on which the vehicle is traveling.

An object of my invention is to provide a wheel stabilizing apparatus for the purpose set forth above which utilizes the principles of the gyro and is such that it becomes more effective as the rotative speed of the wheel assembly to which it is related, is increased.

Another object of my invention is to provide an apparatus of the character referred to involving few parts, each of which is simple in design and both easy and economical to manufacture.

It is a further object of my invention to provide an apparatus of the character referred to which is easy to apply to a wheel assembly and which can be advantageously adjusted and set without the necessity of special skill, machines and tools.

A collateral effect afforded by my new wheel stabilizing apparatus is the tendency for the wheels to hold or maintain movement in a given direction and plane. The effect is brought about by the gyrostatic action of the apparatus and becomes more effective as the rate of rotation is increased.

The above effect is extremely advantageous in vehicles having power steering, that is, where the steering gear is assisted by a suitable servo-mechanism. Power steering is extremely advantageous at low speeds, when the wheels of the vehicle are difficult to turn, but at high speeds, when turning of the wheels is easy, power steering is not only undesirable, but is often-times dangerous, since the driver loses feel and the related sense of control of the car. At low speeds, when power steering is desirable, the gyrostatic effect afforded by my invention is negligible and does not interfere with the power steering, however, as the speed of the vehicle is increased, and the power steering becomes less desirable, the gyrostatic effect of my apparatus increases and buffers the power steering mechanism, slowing its action and tending to maintain the lineal movement of the wheels in a single direction at any particular moment.

The various objects and features of my invention will be fully understood from the following detailed description of typical preferred forms and applications of my invention, throughout which description reference is made to the accompanying drawings, in which:

FIG. 1 is an elevational view of a wheel assembly with the apparatus provided by the present invention related thereto.

FIG. 2 is a sectional view taken as indicated by line 2—2 on FIG. 1.

FIG. 3 is an enlarged detailed sectional view of a portion of the structure shown in FIG. 2.

FIG. 4 is a perspective view of a weight provided by the present invention.

FIG. 5 is an elevational view of a spoked wheel with a modified form of stabilizing apparatus related thereto.

FIG. 6 is a view taken substantially as indicated by line 6—6 on FIG. 7.

FIG. 7 is a view taken as indicated by line 7—7 on FIG. 6.

The ordinary wheel assembly for an automobile involves, generally, a brake drum A rotatably supported on a suitable axle member B, or the like, a wheel C secured to the drum and a pneumatic tire D carried by wheel. In addition to the foregoing, the ordinary wheel assembly further includes an inner tube E within the tire and a hub cap F engaged on one side of the wheel to obscure certain of the less esthetic features of the construction.

The brake drum is a horizontally disposed cylindrical member having a cylindrical side wall 10 with inner and outer ends. The inner end is open and the outer end is closed by a flat, radially disposed end wall 11. The end wall 11 is provided with a central outwardly projecting hub 12 which cooperatively receives the outer end of the axle member, which projects through the drum from the inner end thereof. The end wall is further provided with a plurality of circumferentially spaced axially outwardly projecting wheel studs 13.

The inner open end of the drum is closed by a backing plate 14 fixed to the axle and which carries the brake shoes and elements of the brake actuating means (not shown).

The wheel C includes a central disc portion 15 and an outer rim portion 16. The central disc portion 15 has a central opening 17 to cooperatively receive the hub projection on the drum A, and a plurality of circumferentially spaced stud receiving openings 18 to cooperatively receive the studs projecting from the drum.

The wheel is releasably secured to the drum by means of suitable nuts 19 threaded onto the studs and engaging the outer side of the disc portion of the wheel.

In accordance with normal wheel construction the inner part of the central disc portion is flat and radially disposed so as to occur in a plane parallel to the end wall 11 of the drum, and is suitably contoured and formed about its outer portion to provide structural rigidity to axial forces and the like. In the case illustrated, and in accordance with standard wheel construction, the outer part of the disc portion is formed with an axially outwardly projecting, annular reinforcing rib 20, which rib is substantially U-shaped in cross-section, opening axially inwardly.

The outer rim portion 16 of the wheel is an annular radially outwardly opening U-shaped member having an axially disposed bottom wall 21 and axially spaced, radially outwardly projecting inner and outer flanges 22 and 23, commonly referred to as rim flanges. The bottom wall 20 of the rim portion is fixed to a suitable axially disposed anchoring flange 24 about the periphery of the central portion 15 of the wheel to become, in effect, an integral part thereof and so that the middle part of the disc portion occurs at approximately the central vertical plane of the wheel, that is, on a vertical plane substantially middle-way between the rim flanges 22 and 23.

The above positioning of the central disc portion of the wheel relative to the rim portion, is necessary for accomplishing, as near as possible, static balance of the wheel assembly.

The rim flanges 22 and 23 have axially inwardly and axially outwardly turned lips 25 and 26, respectively, which serve to prevent cutting of the tire D related thereto and in which counter balance weights are ordinarily fixed, as referred to in the foregoing.

The tire D is a conventional automotive type pneumatic tire, engaged about the bottom 21 of the rim and between the flanges 22 and 23.

The inner tube E is a conventional construction arranged within the tire and rim.

Since the tire and tube and their relationship to the wheel are standard and well known in the art, further discussion thereof is unnecessary and will be dispensed with.

The hub cap F is an ornamental, substantially disc-shaped sheet metal part arranged to occur within the rim portion 16 of the wheel, at the outer side thereof and to obscure the hub 12, lugs and nuts 13 and 19 and other unattractive construction and features of the wheel.

The manner in which the hub cap F is fixed to the wheel can vary widely without affecting the novelty of my invention. Accordingly, further discussion of hub cap and its relationship to the wheel will be dispensed with.

It is to be noted, however, the hub cap F is spaced radially inwardly of the rim flanges, with the result that it would not hide balance weights fixed to the rim flanges in accordance with old wheel balancing practice.

In accordance with normal wheel construction the stock about the said openings 18 in the wheel is formed so that the openings are in effect tapered. Further, the ends of the nuts 19 that engage the wheel, that is, the mating ends thereof are complementary tapered to seat in the tapered openings. This relationship of parts is provided so that the nuts serve to accurately center the studs in the openings and consequently accurately center the wheel on the drum.

The wheel assembly thus far illustrated and described is conventional and is that structure which must be considered when attempting to balance, stabilize, or otherwise undertake to reduce or eliminate the adverse effects of out-of-roundness or uneven mass distribution in one or more of the elements, parts and/or portions of the assembly and which put the assembly out of dynamic and/or static balance.

It will be apparent that uneven wall thickness of the brake run, uneven wall thickness and/or out-of-round ness of any portion of the wheel or tire or tube can or will adversely affect the balance of the wheel dynamically and/or statically. It is even possible that wheel nuts of different mass will affect wheel balance.

It will be further apparent that it is practically impossible to determine wherein a displaced mass occurs in a wheel assembly such as set forth above, that is, it cannot be determined if such a mass is in the drum, in the tread of the tire or some other point spaced radially therebetween. Further, it is generally impossible to determine the size or extent that is the area over which it occurs.

So far as out-of-roundness is concerend, it is possible to find such condition, but it is generally impossible to correct it, without upsetting the mass distribution.

From the foregoing, it will be apparent that while an unbalanced, out-of-round wheel assembly may be provided with weights about its rim flanges to make it turn evenly, at lower speeds, it is nevertheless, not balanced, except at that one particular speed, and becomes totally out of balance, as speed of rotation is increased and centrifugal forces exerted by and/or through the several masses turning in different locii come into play.

The wheel stabilizing apparatus G provide by the present invention includes generally, a pair of weights X and Y and mounting means H to secure each weight to the wheel C. The weights X and Y are arranged adjacent the outer surface of the disc portion 15 of the wheel, in circumferential spaced relationship and within the annular reinforcing rib 20 of the wheel.

The mounting means H for each weight is a screw type fastener and engages one of the lugs projecting from the drum and through the wheel disc.

In the preferred carrying out of the invention, the weights are die-cast and each weight weighs approximately one pound. It is to be understood and will be apparent from the following that in certain cases and where it becomes necessary, the weights X and Y can be made heavier and larger, as when confronted with an extremely bad or troublesome wheel, as for application on truck wheels and the like, which are larger and heavier than an ordinary automobile wheel.

Each weight X and Y, in the preferred carrying out of the invention and as illustrated in the drawings, includes an elongate, arcuate body having curved, axially, radially inwardly and outwardly disposed surfaces 30 and 31, axially, inwardly and outwardly disposed sides 32 and 33 and end faces 34. Each weight further includes a radially inwardly projecting longitudinal flange 35 having an elongate, axially disposed, arcuate slot 36 therein to cooperaitvely receive a part of the means H as will hereinafter be described.

The bodies of the weights X and Y are curved about a radius slightly less than the radius of the reinforcing rib 20 of the wheel so that when they are arranged adjacent the wheel, their radially outwardly disposed surfaces 31 oppose the rib and their axially inwardly disposed sides occur adjacent and oppose the central part of the disc portion of the wheel.

The flanges 35 are spaced axially from the axially inwardly disposed sides 32 so that when the weights are related to the wheel, the flange occurs in a plane axially outwardly of the outer ends of the studs 13. Further, the flanges 35 are of such radial extent as to overlie the ends of the studs.

The slots 36 in the flanges 35 are curved about a common axis with the stud pattern of the wheel construction.

With the above construction, it will be apparent that the weights X and Y can be advantageously arranged adjacent the central radially disposed part of the disc portion of the wheel to extend circumferentially between the reinforcing rib and the stud portion and so as not to interfere with the studs and the nuts related thereto.

It is to be noted that it is desirable to arrange the weights as close to the central vertical plane of the wheel assembly as possible and so that the static balance of the wheel is most effectively controlled.

With the weight design set forth above and illustrated in the drawings, my new apparatus can be advantageously incorporated or applied to the wheel assemblies of the major part or number of automobiles now being produced.

It is to be understood, however, that, if desired, the design of the weights of my new apparatus could be changed or modified to fit one particular wheel design and so as to achieve superior results. For example, the body of the weight could be formed to be cooperatively positioned in the space between the rib 20 of the wheel and the rim portion 16. In such a case, the flange on the body would be established to project radially inwardly past the rib 20 and overlie the stud pattern.

By modifying the weights X and Y as suggested above, the bodies of the weight would be spaced a greater distance from the axis of the wheel and could be arranged so that their center of gravity would occur on the central vertical plane of the wheel.

In accordance with the above, while I have chosen to illustrate a particular weight design which occurs radially inwardly of the reinforcing rib on a wheel and is such that it can be applied to many different wheel designs, the broader concept of the invention contemplates making the weights of any suitable design to fit particular wheel designs and so as to afford positioning the center of gravity of the weights in the most advantageous position radially and axially of the wheels.

The mounting means H provided in the preferred form of this invention includes generally, an elongate adapter nut 40 adapted to be substituted for one of the wheel nuts 19 and a clamp bolt 41 engageable through the slotted flange of the weight X or Y to which the said means is related.

The elongate adapter nut is polygonal in cross-section and is provided with an inner tapered end 42 to seat in the tapered opening 18 in the wheel to which it is related and has a flat radially disposed outer end 43 occurring in a plane spaced axially outwardly from the outer ends of the studs 13, when the construction is assembled.

The nuts 40 and wheel nuts 19 are the same in cross-section so that the same wheel wrench can be used to apply or remove the nuts 40 as is used in connection with the nuts 19 and both sets of nuts may obviously be termed enlargements engaging the outer face of the wheel.

The studs 13 to which the nuts 40 are related extend into or through the inner end portions of the nuts, leaving the outer end portions of the nuts free to receive the threaded shanks 44 of the bolts 41.

The shanks of the bolts 41 project through the slots 36 in the weight flanges 35 and are threadedly engaged in the nuts 40.

The heads 45 of the bolts 41 engage the axially outwardly disposed sides of the flanges and serve to hold the weights in tight clamped engagement on the outer ends 43 of the nuts 40.

The heads 45 of the bolts 41 are the same in cross-section as the nuts 40 and 19 so that no special tool or wrench is required to apply or remove them from the construction.

In the form of the invention illustrated in FIGS. 1 to 4, the bolts 41 are provided with radial flanges 46 to occur adjacent the said outer surface of the weight flanges 35 and which serve to provide additional frictional bearing surface between the means H and the weights, so that when the structure is rotated, the centrifugal forces generated will not cause the weights to pivot relative to the means H and to swing out, out of radial position.

In the form of the invention illustrated, the reinforcing rib 20 of the wheel provides a suitable stop to prevent undesirable radial outward shifting and displacement of the weights.

The nut and bolt assembly going to make up the means H weighs several ounces more than the standard nuts which they replace. As a result, they add to the overall mass of the apparatus.

The ordinary or conventional wheel construction has five (5) studs 13. As a result of this uneven distribution, the means H cannot be arranged at diametrically opposite sides of the wheel assembly and as a result, would tend to establish an unbalanced condition. This is corrected, however, by shifting the weights X and Y circumferentially to correct such a condition.

In applying the apparatus that I provide to a wheel assembly, the heavy side of the wheel, if such exists, is located and can be suitably marked (as indicated by the circle 0 in FIG. 1 of the drawings). Locating the heavy side of the wheel assembly can be easily accomplished by letting the wheel turn freely on its axis and permitting gravity to urge the heavy side down.

With the heavy side of the wheel assembly located, the weights X and Y are positioned adjacent the side of the wheel approximately 90° in each direction from the heavy point and at approximately 180° from each other. The appropriate wheel nuts 19 are replaced with the mounting means H and the weights X and Y are connected with the wheel assembly thereby. The weights are then shifted circumferentially of the wheel so that the mass of the means H and the extra mass of the wheel is substantially balanced out. This generally requires very little movement of the weights, since the means H are near to being at opposite sides of the wheel and in near balance and the heavy side of a wheel is generally less than 5 or 6 ounces heavier than the opposite side of the wheel.

When the weights are properly positioned in the manner set forth above, the means H is tightened so as to secure the weights in fixed position.

In practice, when the wheel assembly is substantially balanced, when turning at a low rate and before centrifugal forces are encountered, the weights X and Y can be arranged at diametrically opposite sides, at any point about the circumferential extent of the wheel. This can be done when the heavy side of the wheel is one or two ounces heavier.

With the weights X and Y thus positioned and anchored in the wheel assembly, it will be apparent that when the wheel is turned at a rapid rate, the weights X and Y generate a gyrostatic effect which tends to keep the wheel assembly in the same vertical and horizontal planes. As the speed of rotation is increased, the gyrostatic effect is increased.

Since the combined weight of the weights X and Y and the means H is in excess of two (2) pounds and the unbalancing forces at various points about the wheel are one or two ounces and rarely more than eight ounces, the gyrostatic effect of the stabilizing apparatus is the major or predominant factor and overcomes the other, minor factors affecting the balance of the wheel assembly.

The apparatus that I provide is such that it will effectively stabilize the wheel assembly to which it is related until such time as an unbalancing mass in the wheel is rotating at a rate sufficient to overcome the gyrostatic effect of the apparatus.

It has been determined that with the particular form of the apparatus illustrated, applied to a wheel assembly including an 800–15 tire, which tire is eight ounces heavy, at one point about its circumference, the wheel assembly would have to turn at a rate equal to more than two-hundred lineal miles per hour, before the said eight ounces at the periphery of the tire would overcome the gyrostatic effect of the apparatus and render it ineffective.

In the modified form of the invention shown in FIGS. 5, 6 and 7 of the drawings, I have shown a typical wire or spoked wheel construction, which construction includes an elongate, tubular hub 50, an annular rim 51, and a plurality of circumferentially spaced, substantially radially outwardly projecting spokes 52 at each end of the hub and fixed to and supporting the rim. A suitable tire 53 is carried by the rim.

The above wheel assembly is rotatably supported on an axle member (not shown), and is maintained thereon by a suitable wing nut 54, or the like.

It will be apparent that in such a construction, the mounting means H employed to mount the weights X and Y in the first form of the invention cannot be used. Accordingly, I provide a special or modified mounting means H' to support weights X' and Y', which weights are or can be identical with the weights X and Y previously described.

The mounting means H' includes a pair of like, semicircular or arcuate clamp members 60 adapted to be engaged about diametrically opposite sides of the hub 50, intermediate the ends thereof. Each clamp member is provided with radially outwardly projecting apertured ears 61 at its ends and a radially outwardly projecting, apertured tab 62 intermediate its ends. The ears occur in planes parallel with the axis of the hub, while the tab 62 occurs in a plane at right angle to the axis of the hub.

The means H' further includes a pair of tie bolts 65, with nuts 66 and engaged through and extending between the adjacent, opposing ears 61 of the clamp members, to hold the said members in tight clamped engagement with the hub, a stud 67 engaged in the tab 62 on each clamp member to project laterally therefrom and through the slot in the weights X or Y related thereto and a nut 68 engaged on the stud and holding the weight in tight clamped engagement on the tab.

In this modified form of the invention, it will be apparent that the weights can be arranged in fixed position with the hub in any desired rotative position and occur within the confines of the axially spaced sets of spokes.

In all other respects, that is, the mode of operation and effect, in this modified form of the invention, is the same as that shown in FIGS. 1 to 4.

From the foregoing, it will be apparent that I provide a novel apparatus for stabilizing an automotive type wheel assembly which assembly would otherwise vibrate, wobble and otherwise turn in an uneven manner, due to inherent imperfections in such assemblies which affect their balance and uniform configuration.

Having described only typical preferred forms and applications of my invention, I do not wish to be limited or restricted to the specific details herein set forth, but wish to reserve to myself any modifications or variations that may appear to those skilled in the art and fall within the scope of the following claims:

Having described my invention, I claim:

1. A stabilizing apparatus applicable to an automobile wheel assembly having a brake drum rotatably supported on an axle and having an annular series of axially projecting wheel engaging studs projecting therefrom, a wheel having a central disc portion to occur adjacent the drum and having openings to receive the studs and having an annular rim portion surrounding the disc portion, a pneumatic tire carried by the rim, and wheel nuts engaged on the studs and holding the wheel fixed on the drum, said apparatus including, a pair of like arcuate weights positioned adjacent the disc portion of the wheel radially outward of the studs, each weight having a radially inwardly projecting mounting flange with an arcuate slot positioned adjacent the end of a stud, said weights occurring within the confines of the rim and at substantially opposite sides of the central axis of the wheel assembly, and mounting means engagable in the slots in the mounting flanges and securing the weights in fixed position on the studs and in the wheel assembly.

2. A stabilizing apparatus applicable to an automobile wheel assembly having a brake drum rotatably supported on an axle and having an annular series of axially projecting wheel engaging studs projecting therefrom, a wheel having a central disc portion to occur adjacent the drum and having openings to receive the studs and having an annular rim portion surrounding the disc portion, a pneumatic tire carried by the rim, and wheel nuts engaged on the studs and holding the wheel fixed on the drum, said apparatus including, a pair of like arcuate weights with axially disposed inner and outer sides positioned in the wheel assembly radially outwardly of the studs, with their inner sides adjacent the disc, radially inwardly projecting mounting flanges having arcuate slots on the outer portions of the weights and positioned adjacent the ends of the studs said weights being wholly within the confines of the rim and at substantially opposite sides of the central axis of the wheel assembly, and mounting means related to each weight engageable in the slot in the mounting flange and securing the weight in the wheel assembly including, an adapter nut engaged on one of the studs and a lock bolt engaged through the slot in the flange of the weight and in the adapter nut and holding the flange in tight clamped engagement on the nut.

3. A stabilizing apparatus applicable to an automobile wheel assembly having a central hub, an annular rim surrounding the hub and axially spaced sets of substantially, radially disposed spokes fixed to and extending between the hub and the rim, mounting means releasably engaged about the hub between the sets of spokes, and a pair of weights carried by the mounting means to occur at substantially opposite sides of the hub and within the confines of the sets of spokes, said mounting means including a pair of arcuate clamp members embracing the hub, tie bolts extending between the adjacent, opposing ends of the clamp members, a tab projecting from each clamp member and a stud on each tab and projecting axially from one side thereof, said arcuate weights having radially inwardly projecting, slotted mounting flanges to occur adjacent the tabs and receiving the studs, and a lock nut threadedly engaged on each stud to hold the mounting flange of the weight related thereto in tight clamped engagement on the tab.

4. In a vehicle wheel: a hub member; a wheel removably mounted on said hub; a plurality of circumferentially spaced securing means holding said wheel on said hub, said securing means including enlargements engaging the outer face of said wheel; a pair of separate unitary weights, each separately, slidably and directly engaging said enlargements and being generally diametrically opposite each other; means releasably securing said weights to said enlargements; and means for guiding said weights circumferentially of said hub, on said enlargements.

5. In a vehicle wheel; a hub member; a wheel having an outer face removably mounted on said hub; a plurality of circumferentially spaced securing means holding said wheel on said hub and including enlargements engaging the outer face of said wheel; a pair of separate unitary weights, each being separately mounted on one of said enlargements generally diametrically opposite the other weight; means releasably securing said weights to said enlargements; and means for guiding each of said weights circumferentially of said hub, on its supporting enlargement.

6. A wheel as defined in claim 5 wherein each of said weights comprises a web portion overlying its supporting enlargement; an arcuate slot in said web portion; said securing means comprising a member extending through said slot.

7. A wheel as defined in claim 6 including a mass of heavy material along at least one edge of said web portion.

8. A wheel as defined in claim 6 including a mass of heavy material along at least one edge of said web portion, said mass of material extending from said web portion toward said outer face laterally of said enlargement.

9. A wheel as defined in claim 5 wherein each of said weights comprises a web portion overlying its supporting enlargement; an arcuate slot in said web portion; said securing means comprising a member extending through said slot, said supporting enlargement being of greater axial dimension than adjacent enlargements whereby said web portion may be adjusted to positions overlying but axially displaced from said adjacent enlargements.

10. In a vehicle wheel: a hub member; an annular rim surrounding said hub member; axially spaced sets of substantially radially disposed spokes fixed to and extending between the hub and the rim; mounting means carried by said hub between said sets of spokes and having substantially diametrically opposed projections; and a circumferentially adjustable weight releasably secured to each of said projections.

11. In a vehicle wheel: a hub member; a wheel with an axially-extending annular tire-supporting rim and a central radially-disposed disc with inner and outer faces between the ends of the rim and removably mounted on said hub; a plurality of circumferentially-spaced securing means holding said disc on said hub and including enlargements engaging the outer face of said wheel; a pair of separate unitary weights, each being separately mounted on one of said enlargements generally diametrically opposite the other weight and within the confines of the rim; means releasably securing said weights to said enlargements and means for guiding each of said weights circumferentially of said hub on its supporting enlargement.

12. In a vehicle wheel: a hub member; a wheel with inner and outer faces removably mounted on said hub; a plurality of circumferentially-spaced securing means holding the inner face of the wheel on said hub and including enlargements engaging the outer face of said wheel; a pair of separate unitary weights, each being separately mounted on one of said enlargements, generally diametrically opposite the other weight; means releasably securing said weights to said enlargements; means for guiding each of said weights circumferentially of said hub, on its supporting enlargement; and means on the wheel for engaging said weight and limiting radial outward shifting thereof.

13. A vehicle wheel: a hub member; a wheel with inner and outer faces releasably mounted on said hub; a plurality of circumferentially-spaced means holding the inner face of the wheel on said hub and including enlargements engaging the outer face of said hub; a pair of separate unitary weights, each being separately mounted on one of said enlargements generally diametrically opposite the other weight; means releasably securing said weight to said enlargements; means for guiding each of said weights circumferentially of said hub, on its supporting enlargement; and an annular projection on said outer face of the wheel radially outwardly of said enlargements for engaging said weights and limiting radial outward shifting thereof.

References Cited in the file of this patent

UNITED STATES PATENTS

| 79,475 | Jones | June 30, 1868 |
| 1,874,712 | Sponable | Aug. 30, 1932 |
| 2,329,854 | Rubsam | Sept. 21, 1943 |
| 2,927,821 | Palmer | Mar. 8, 1960 |
| 2,957,366 | Driver et al. | Oct. 25, 1960 |

FOREIGN PATENTS

| 256,843 | Italy | Jan. 21, 1928 |
| 18,958 | Great Britain | 1905 |